United States Patent [19]
Caretto et al.

[11] 3,815,093

[45] June 4, 1974

[54] SIGNALING SYSTEM UTILIZING FREQUENCY BURST DURATION AND ABSENCE FOR CONTROL FUNCTIONS

[75] Inventors: Howard L. Caretto, Brooklyn, N.Y.; Charles W. Cook, Huntsville, Ala.; Gustave A. Johnson, Laurence Harbor, N.J.

[73] Assignee: AFA Systems, Inc., New York, N.Y.

[22] Filed: May 11, 1973

[21] Appl. No.: 359,238

[52] U.S. Cl. ....... 340/152 T, 179/2 R, 340/147 PC, 340/312

[51] Int. Cl. .............................................. H04q 9/00

[58] Field of Search ............ 340/147 R, 151, 152 T, 340/167 A, 147 PC; 179/2 A, 2 R

[56] References Cited

UNITED STATES PATENTS

| | | | |
|---|---|---|---|
| 3,634,824 | 1/1972 | Zinn | 340/147 R |
| 3,754,215 | 8/1973 | Blomenkamp | 340/151 |

*Primary Examiner*—Donald J. Yusko
*Attorney, Agent, or Firm*—Brumbaugh, Graves, Donohue & Raymond

[57] ABSTRACT

A signaling system has a plurality of remote transponders, which transmit signals, representative of the states of sensors associated with the transponders, to a central station in response to addressed interrogation signals transmitted by the central station. The interrogation signals include audio frequency bursts, whose width, in combination with the width of the space after the burst, indicates the address of the transponder group being interrogated. The state signals from the transponders also include frequency bursts, whose frequency indicates which transponder of a group having a particular address is responding and whose width indicates the state of the sensors associated with that transponder. The state signals cause display devices at the central station to indicate changes in the conditions at the remote monitors.

9 Claims, 6 Drawing Figures

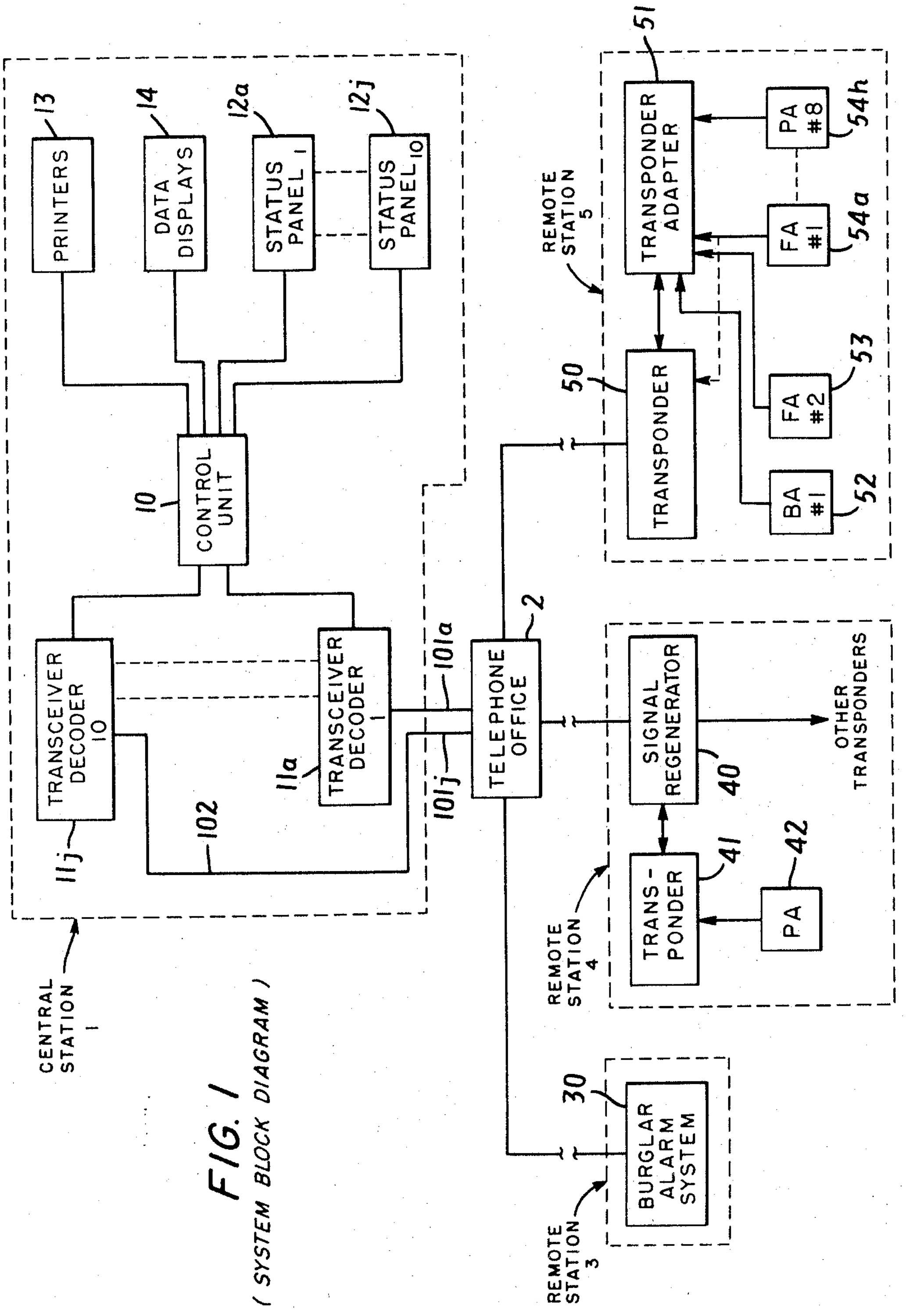
FIG. 1 (SYSTEM BLOCK DIAGRAM)

( CONTROL UNIT )

( TRANSCEIVER / DECODER )

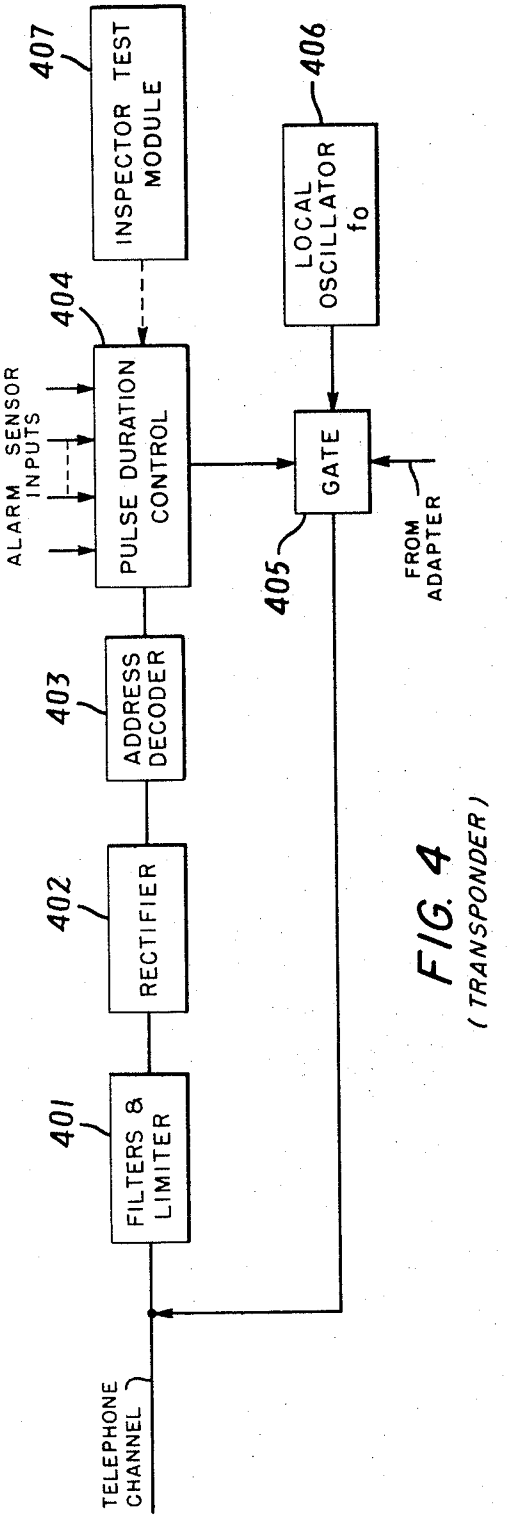
FIG. 4 (TRANSPONDER)
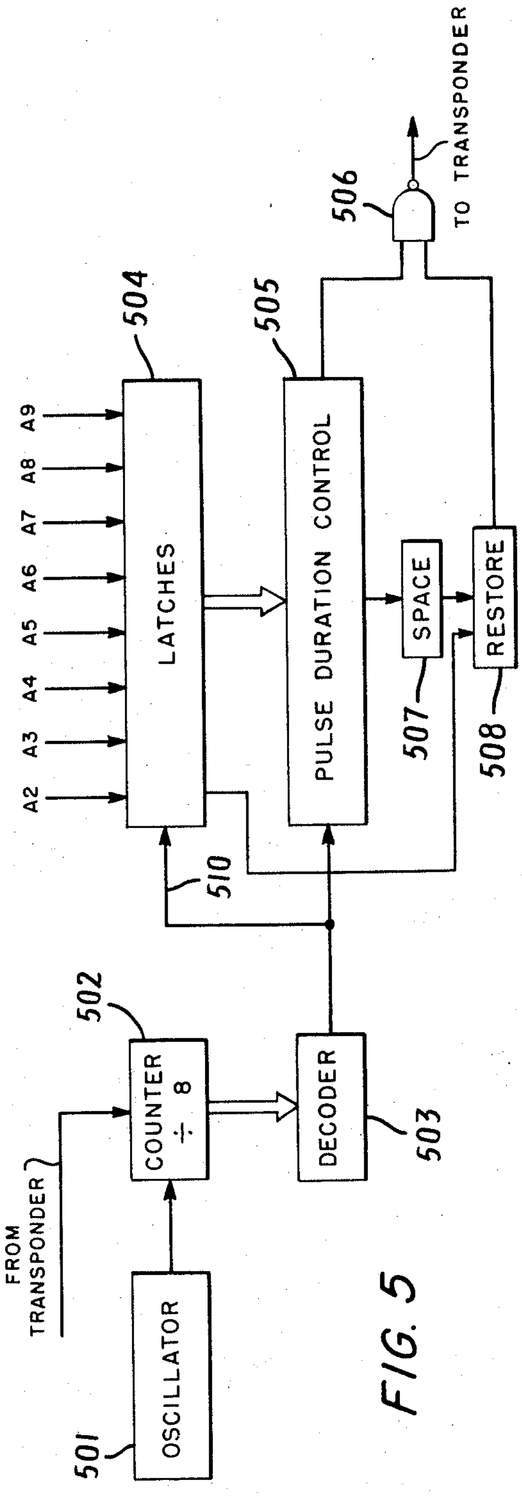
FIG. 5

SIGNALING SYSTEM UTILIZING FREQUENCY BURST DURATION AND ABSENCE FOR CONTROL FUNCTIONS

BACKGROUND OF THE INVENTION

This invention relates to signaling systems and, more particularly, to alarm monitoring and industrial control systems where information must be transmitted by a plurality of remote stations to a central station for the purpose of displaying the information.

The traditional central monitoring systems are d.c. systems, which require special cabling between the remote stations and the central station. Because of the type of equipment used with these d.c. systems (e.g., relays), only a limited amount of information can be conveyed by each remote station. Therefore, the d.c. systems are relatively expensive and inflexible. To overcome some of these drawbacks, multiplex systems have been employed. These sychronous multiplex systems use the central station to send timing pulses to the remote stations where these timing pulses sychronize local clocks. These local clocks then determine when the remote station will report its status to the central station. However, with such a system spurious signals will upset the timing and cause the remote stations to respond in an erratic manner. In addition, these systems have proved to be expensive and complex. These multiplex systems also require the special cabling of the d.c. systems and are, therefore, relatively inflexible.

To improve the flexibility of these systems, signaling can be accomplished with bursts or pulses of audio frequency tones. This signaling technique allows the use of voice grade telephone lines as part of the transmission system between the central station and the remote stations, thereby extending the system to any location with a telephone. Such a system is described in U.S. Pat. No. 3,634,824 of L. Zinn and M. Bodin. These frequency burst systems are generally transponding in nature, i.e., an interrogation signal is sent at fixed intervals and the response signal is sent only after the interrogation signal has been received at the remote station. Therefore, these systems are not susceptible to the same type of spurious signal that the synchronous systems are hampered by. There are also some systems which use digital pulses to transmit the information; but, these require high grade telephone lines which are more expensive than voice grade lines.

The frequency burst system described in the above-identified patent uses the variable widths of the frequency pulses as addresses to indicate which of the series-connected remote stations is being interrogated. A remote station responds, after receiving it's interrogation pulse and before the next interrogation pulse is sent, by generating a burst at a different frequency. The width or absence of this pulse is an indication of the status of the sensor at the remote station. Unless amplification is provided in each transponder connected in series, it is possible for the signals to be reduced to such an extent that they are unusable, especially when a large number of remote stations are employed.

SUMMARY OF THE INVENTION

It is an object of this invention to provide an alarm signaling system with a relatively large number of remote stations, which may be interrogated over voice grade telephone lines and which have reduced susceptibility to spurious signals. This object is in part accomplished by using frequency bursts whose duration, and the duration of the space or spaces immediately following the bursts, determines which remote station is being interrogated. Also, the system is operated in a transponding or asynchronous manner so as to reduce the effects of spurious signals. The effects of noise are farther reduced without the need for separate amplifiers in each transponder by operating the system in a parallel transmission mode.

In an illustrative embodiment of the invention, a central station is connected in parallel with remote stations by means of conventional voice grade telephone lines. Each remote station may represent a separate building or customer of a burglar and/or fire alarm system. The central station is comprised of a transceiver/decoder, a control unit, data display devices and a status panel.

The control unit generates interrogation pulses either automatically or in response to a call-up signal from the status panel. These pulses are actually bursts of an audio frequency tone which vary in duration according to which remote station is to be interrogated. The first pulse of the signal and the space following it can be any of five different durations, thus allowing for 25 separate address codes for the remote stations. The end of the address code is then indicated by a second pulse of fixed duration. Following this second pulse there is blank space of fixed duration in the interrogation signal to allow for the response from the remote station group. Finally, the pulse and space representing the address code for the next remote station to be interrogated is generated by the control unit.

The interrogation signal is sent from the control unit to the transceiver/decoders of the central station, which send it over telephone channels to the remote stations. At the remote stations the address code is decoded and a transponder at the remote station being interrogated generates a response frequency pulse or burst whose duration indicates the status of the sensors or alarms at that location. This response is made as soon as the address is decoded and not at any fixed interval. Each address on a particular telephone channel can have up to four transponders and transponder adapters which generate the response signals indicating the condition of up to 10 sensors for each transponder and its adapter. The bursts of audio frequency tone generated by each transponder on a particular telephone channel with the same address differ in frequency from those of the other transponders with that burst address and, also, from the frequency of the interrogation pulses. The duration of these response frequency pulses indicates which of the several possible alarms or sensors associated with a transponder has been activated. Therefore, each telephone line between the central station and the telephone office can interrogate 25 addresses having a total of 100 transponders, which indicate the status of up to 1,000 separate alarms. Also, it is practical with this system to use multiple telephone channels with a single control unit.

The response signals are received by the transceiver/decoders at the central station, where they are separated according to the frequency of the transponders interrogated. Then the durations of the signals at the various frequencies are decoded, thereby determining which alarm associated with which transponder at the interrogated address has been activated. The transceiver/decoder will also generate a missing pulse signal if no response is received from an interrogated address. These decoded signals are then sampled and sent to the control unit which uses them to activate the control panel and the display devices of the system.

BRIEF DESCRIPTION OF THE DRAWINGS

The foregoing and other features of the present invention will be more readily apparent from the following detailed description and drawings in which:

FIG. 1 is a block diagram of an illustrative embodiment of the invention;

FIG. 4 is a schematic of a Transponder of FIG. 1; and

FIG. 5 is a schematic of the Transponder Adapter of FIG. 1.

DESCRIPTION OF EXEMPLARY EMBODIMENTS

Figure 2A:
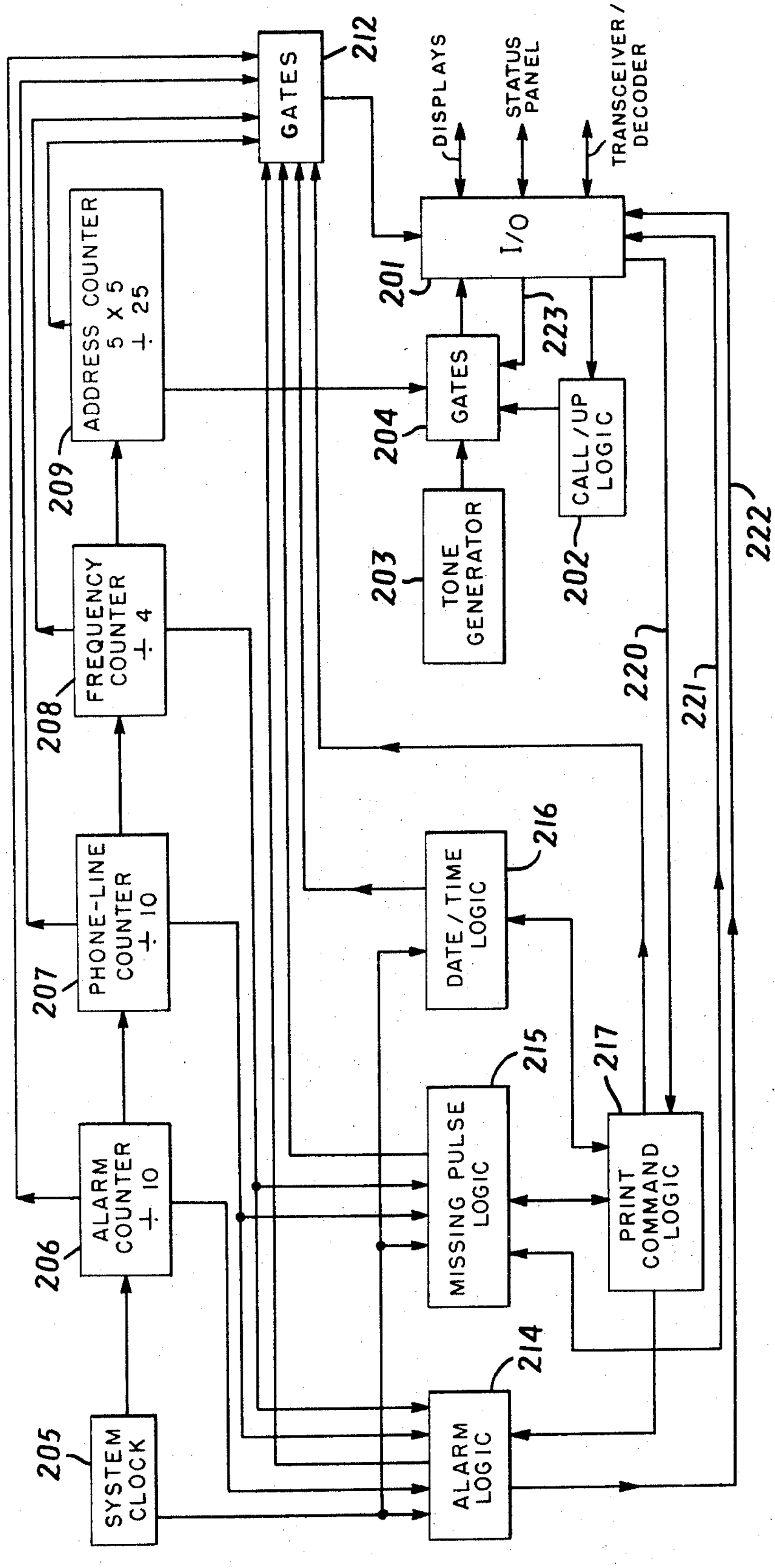
FIG. 2A is a block diagram of the Control Unit of FIG. 1.

FIG. 1 shows a block diagram of an alarm system illustrative of the invention in which a central station 1 is connected to a telephone central office 2 by means of ten voice grade telephone channels, 101*a*–101*j*. The bridging equipment in the telephone office 2 connects each telephone channel from the central station 1 with 100 remote stations, three of which are indicated as remote stations 3, 4, and 5 in FIG. 1.

The central station 1 is comprised of a control unit 10, ten transceiver/decoders (11*a* through 11*j*), 10 status panels (12*a* through 12*j*) and various display devices, 13 and 14. The control unit 10 of the central station generates an interrogation signal like that shown in FIG. 2B. The duration of the first pulse of this signal and the duration of the space following act as an address code and determine which of the remote stations are to be interrogated. In this embodiment the first pulse and the space take on five different' widths, thereby allowing 25 separate address codes. Ordinarily, the control unit will sequence through all the addresses for the remote stations checking the status of the entire system. However, a particular remote station can be interrogated at will by using the call up feature of the data display. The address desired is set into the data display and the control unit responds by generating the interrogation signal address code for that location. Besides the address code, the interrogation signal also has an end of address signal and a space in which the response from the remote station can be inserted.

Although pulse duration codes represent a preferred embodiment and are described herein, it should be understood that other addressing forms may be used, e.g., the number and/or spacing of the audio tone pulses.

The overall interrogation signal generated by the control unit 10 is sent to the ten transceiver/decoders, 11*a*–11*j*. Each transceiver/decoder is connected to a separate voice grade telephone channel, such as 101*a*, which carries the interrogation signals to the telephone office 2. As can be seen from FIG. 1, a single control unit is capable of handling 10 of these transceiver/decoders, which act as buffer amplifiers for the outgoing interrogation signal. A single control unit may be modified to accommodate more than ten transceiver/decoders provided prevailing UL and NFPA rules permit.

The telephone office 2 then connects each of the 10 lines from the central station in parallel with 100 individual remote stations. Operation of this system in parallel rather than in series has at least two advantages. First, one defective remote station will not interrupt the entire system. Second, when a remote station is defective, it is easy to locate. If a single station has a faulty response the problem is somewhere in that particular line. Also, if a group of transponders have a problem, it is likely to be found in a point common to all of those transponders.

In FIG. 1, telephone channel 101*a* is shown connected to three remote stations, 3, 4 and 5 through appropriate telephone bridging equipment. Each of these remote stations can represent a separate building or client of a centralized monitoring system and has one transponder associated with it. Therefore, the sensor equipment at each remote station varies according to the needs of the client (burglar, fire, pressure, temperature, etc.). In particular, remote station 3 has a self-contained burglar alarm system with the associated sensors, a transponder and a control panel. This system allows for display of the condition of the local sensors, not only at the central station, but, also on the burglar alarm panel at the remote station. At remote station 4, the telephone channel is connected to a signal regenerator 40, capable of driving a number of transponders. Such a station can be one of a group of remote stations serving one client or building. In such a case all of the transponders of this group of remote stations can be driven by the regenerator 40. However, in FIG. 1 only one transponder 41, with a single pressure monitor 42, is shown connected to regenerator 40. These regenerators could be of conventional design or could be the regenerators shown in copending application Ser. No. 358,863 filed May 10, 1973 of Charles W. Cook. The regenerator of the Cook application can also be used as part of a tree network which expands the 10 telephone channels from the central station to the 1,000 remote stations.

Remote station 5 has been arranged with a single transponder 50 and a transponder adapter 51. Ordinarily, a transponder of the type used with the present invention can handle up to four sensors. However, when it is used in conjunction with the transponder adapter, the combination can handle up to ten alarm sensors. Two of these sensors, burglar alarm 52 and fire alarm 53, will have appropriate priority in the transponder adapter 51 to which they are connected. The remaining sensors, indicated as 54*a* through 54*h*, like the alarms 52 and 53 are connected to the adapter 81. Generally, the adapter allows all of these sensors to be multiplexed into transponder 50 with a preference given to priority alarms, e.g. fire alarm 52. Block diagrams of such an arrangement are shown in FIGS. 4 and 5.

The transponder of each remote station indicated in FIG. 1 receives the interrogation signal from the central station. Each of these transponders checks the address code, comprised of the durations of the first pulse and first space of the interrogation signal, to see if it is being interrogated. When a particular transponder recognizes its interrogation code it generates a response signal at the end of the address code. This response signal shown as H in FIG. 2B, like the interrogation signal, is comprised of audio frequency bursts whose durations are in indication of the status of the sensors associated with the transponder. For each address assignment there can be several transponders. Which generate their response signals simultaneously when that address is interrogated. However, each transponder with a particular burst address on a particular telephone channel is assigned a separate frequency, thereby allowing the response signals from the transponders on that telephone channel to be added together for transmission to the central office. In the transceiver/decoders of the central office these response signals are separated by bandpass filters centered at the frequencies of the transponders and then decoded. The control unit uses these decoded signals to activate the printers 13 and the displays 14, so that a permanent and illuminated temporary indication of a change in status of the remote sensors is obtained.

With the arrangement shown in FIG. 1 the central station sequentially requests the status of the sensors at the various remote stations by having its control unit generate the address codes for those stations. After each address code the central station leaves a blank space in its interrogation signal which is filled with the response signal from the transponders assigned the address code generated. The only limitation under current UL 611 and NFPA 711 standards is that there should be only four transponder frequencies for each address code on each telephone channel with the embodiment of the invention illustrated. Like the interrogation signal the response signals consist of audio frequency bursts whose durations indicate the status of the sensors associated with each transponder. When the response signals are received at the central station, they are decoded and their information content displayed.

The features of the control unit of the central station are shown in block diagram form in FIG. 2A. The basic system clock 205 generates a timing signal (e.g., 50KHz) which is divided by 10 in the alarm counter 206. The output of the alarm counter provides for the timing of the reading of the decoders for the possible alarm levels from each transponder and/or its adapter. The output of the alarm counter 206 is, in turn, divided by 10 in phone line counter 207, which allows for the timing of the reading of the outputs of the 10 possible transceiver/decoders. The output of the phone line counter 207 is then divided by four in the frequency counter 208, which times the reading of the outputs of the decoders for the four separate frequencies transmitted by each transponder with a particular address. Finally, the output of the frequency counter 208 is divided by 25 in address counter 209, which causes the control unit to sequence through the 25 addresses for the remote locations. All of these counter circuits are of conventional type and are well known in the art.

Figure 2B:
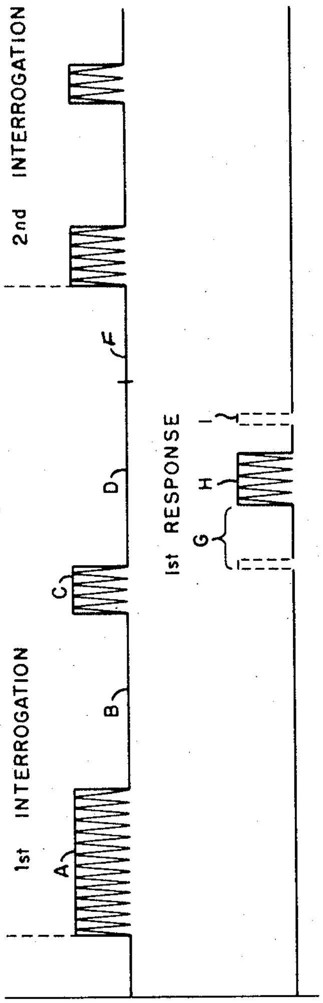
FIG. 2B is a graph of a typical interrogation signal and a response signal.

The input/output circuit 201 allows the control unit to communicate with both the display devices and the transceiver/decoders. The input/output circuit comprises a group of line drivers and receivers, and a switching network under the control of gate circuits 212 for directing input and output signals to the proper locations. In particular, the input/output circuit 201 directs the interrogation signal generated by the control unit to the transceiver/decoders. This interrogation signal is created by gate circuit 204 operating on tone generator 203. The tone generator is a conventional audio frequency oscillator which produces an audio tone at, for example, 2,000Hz. This audio tone is turned on and off under the influence of gating circuit 204 in order to create a signal such as that shown in FIG. 2B. The duration of the first audio pulses, A of FIG. 2B, is controlled by one of the divide-by-five counters which comprise a part of address counter 209. Typically, this pulse varies between 50 and 300 milliseconds in duration. The space B immediately following the A pulse is under the control of the other divide-by-five counter of the address counter and has a width variation similar to that of the A pulse. Therefore, there are 25 different combinations for pulse A and space B, which serve to define the address code for the interrogation signal. The pulse C in FIG. 2B is used to indicate the end of space B and the beginning of space D. Space D is of fixed duration, typically 900 milliseconds, and is made available for the response signal from the transponders, shown as G, H and I in FIG. 2B. When the response signal indicates that information must be printed, the next address is not generated until the display devices indicate to gate circuit 204 that they have completed their operation. This signal passes from input/output circuit 201 over line 223 and the time it takes for this signal to be received is indicated by variable space F in the interrogation signal of FIG. 2B. This asynchronous operation makes the system entirely positive, successive and non-interfering.

Under the influence of the address counter 209, the interrogation signal sequences through all the transponders in turn. With the full system this takes about 39 seconds. However, if knowledge of the conditions at a particular station is desired out of turn, a call up signal may be manually initiated at the data display. This signal then passes through input/output device 201 to the call up logic crcuit 202. This call up circuit then overrides the address counter and causes the transponder in question to be interrogated and displayed.

Figure 3:
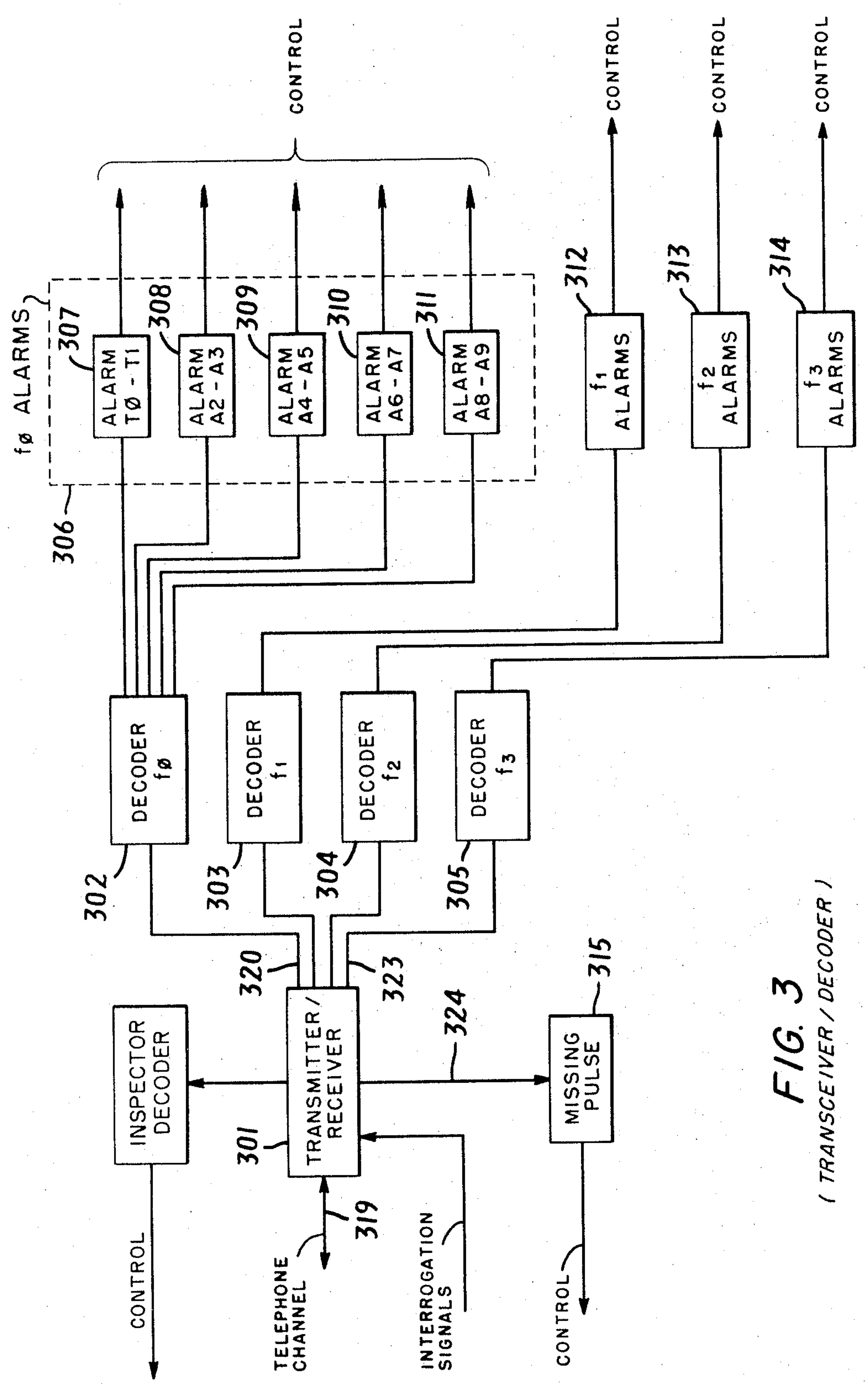
FIG. 3 is a block diagram of the Transceiver/Decoder of FIG. 1.

The system of the present invention is designed to indicate a change in the status of the alarm sensors at the remote stations. When change occurs in a sensor, signals are generated in the transceiver/decoder indicating that either an alarm condition has just occurred or has been eliminated. These signals are then used to activate the display devices, such as printer 13 in FIG. 1, and to sound an audible alarm. The print command signal from a transceiver/decoder, like that one shown in FIG. 3, is generated when the response signal indicates a change of status. This signal passes through the input-output circuit and is applied to the print command logic circuit 217 over line 220. This circuit works in conjunction with alarm logic circuit 214, missing pulse logic circuit 215, and date/time logic circuit 216 in order to create an output signal to the printer which will cause it to print the location of the alarm or alarm restoration together with the date and time. To insure that the print signal and information is directed correctly, the outputs of the alarm, missing pulse, date/time and print circuits are connected to gating circuit 212, which controls the input/output circuit. Also, the alarm, missing pulse and date/time circuits receive timing information from the system clock 205, the alarm counter 206, the phone line counter 207, and the frequency counter 208, thereby helping these circuits to correctly identify the locations where the change has occurred. Lines 221 and 222 carry the alarm and restore information between the transceiver/decoder and the missing pulse logic and alarm logic circuits, respectively. Besides the printing operation, the control unit also causes visual indicators (e.g. light emitting diodes or lamps) on the control panel to show where a change in status has occurred.

While the control units has only been shown in block diagram form, the circuits are of a conventional type and could be designed by anyone skilled in the art given the description of the functions set forth above.

FIG. 3 is a block diagram of a transceiver/decoder which can be utilized in the present invention. The transmitter-receiver circuit 301 of FIG. 3 is connected to the phone channel 319 and acts as a line driver and receiver for the signals transmitted between the remote stations and the central station. Transmitter/receiver 301 has its outputs 320–324 applied to decoders 302 through 305 and missing pulse circuit 315. The missing pulse circuit generates a signal whenever it detects that there is no response signal from a remote station. This missing pulse signal is used to indicate that a remote station is inoperative.

The transmitter/receiver circuit 301 also filters the signals from phone channel 319 with bandpass filters centered at frequencies $f_0, f_1, f_2$ and $f_3$, respectively, and directs them appropriately to decoder circuits 302, 303, 304 and 305. The center frequencies of these filters corresponds to the four frequencies available from the four transponders with a particular address. Next, each decoder circuit measures the duration of its filtered signal to determine which of the several alarm monitors (e.g. $T_0$, $T_1$, and $A_2$ through $A_9$) has changed status. The outputs of the decoder circuits are then directed to four alarm circuits 306, 312, 313 and 314. These circuits generate the signals that the control unit uses to activate the printer and display devices. Each of the alarm circuits is comprised of output gates, such as circuits 307 through 311 of $f_0$ alarm circuit 306. These output gates can each handle two alarm levels by generating the proper control unit signals.

As shown in FIG. 1, the transponders used in the present invention can be connected to an individual drop from a bridge on the telephone exchange or to the transponder terminals of a regenerator. A diagram of such a transponder is shown in FIG. 4. The input from the telephone channel or regenerator is applied to filter circuit 401. This circuit is comprised of a high pass filter (to eliminate 60 Hz noise) connected in series with a bandpass filter, which is centered at the frequency of the interrogation signal tones, typically 2,000 Hz. The output of the filter circuit 401 is applied to rectifier circuit 402, in order to create a series of d.c. pulses from the interrogation signal. These pulses are then applied to address decoder 403 which measures the duration of pulse A and space B (see FIG. 2B). If the address decoder 403 determines that this transponder is being interrogated, it sends a trigger pulse to the pulse duration control circuit 404.

The pulse duration control circuit is basically a monostable multivibrator with different timing circuits, representing the alarm sensors possible with a transponder. The timing circuit connected to the multivibrator and, hence, the pulse duration produced by the multivibrator on receiving the trigger pulse from the address decoder, is determined by the alarm sensor which is activated or the absence of any activated sensor. The transponder is also adapted to accept an inspector test module 407 which changes the logic to insert an identifiable pulse duration followed by a space of proper duration (shown as G in FIG. 2B) that will activate the decoder circuits of FIG. 3 to display an indication that an inspector is on the premises testing the system. Therefore, the central station operator will know that the alarms activated are part of a test and that the police or fire departments need not be notified.

The pulse generated by circuit 404 opens gate 405 and allows the signal from local oscillator 406 to be applied to the phone channel in space D of the interrogation signal. The frequency of the local oscillator, $f_0$, in FIG. 4, is adjusted so that it is different from the frequency of the interrogation pulses and also from the frequencies ($f_1, f_2$ and $f_3$) of the other transponders with the same address. Because of this difference in frequency the four possible response signals on a particular telephone channel can be superimposed on each other, thus saving time and increasing the capacity of the system. When the response signal is received in the central station these signals are separated by the filters in the transmitter/receiver 301 shown in FIG. 3.

When it is desired to have more than four alarm sensors associated with a transponder, a transponder adapter such as that shown in FIG. 5 can be used. This transponder adapter has a multiplexer that multiplexes alarm sensors, typically $A_2$ through $A_9$, into the associated transponder. The multiplexer is basically comprised of an oscillator 501, an eight-bit counter 502 and a counter decoder 503. The output of the oscillator 501 is divided by the counter 502. Then the counter output is converted from a four line binary code to an eight line decimal code by decoder 503. Each line of the decoder is sent to a separate alarm sensor on lines 510. If one of the alarms is activated, it will operate one of the latches in latch circuit 504. When the line from the decoder to a latched alarm is energized, the counter will stop advancing the decoder because of a signal from the transponder. Then the transponder will transpond the pulse duration corresponding to that alarm since the latches also control the timing of the pulse duration control circuit 505. This pulse from circuit 505 is sent to gate circuit 405 in FIG. 4 by way of NAND gate 506. Once the proper signal for the latched alarm is sent the counter advances the decoder output until it comes to another latched alarm, where the process of sending the proper pulse duration response signal is repeated. When there are no other latched alarms, the decoder output proceeds until it comes around to the initial alarm again. When two alarms are present, the adapter circuit alternately sends the pulse duration for the two alarms. When more than two latched alarms are present the adapter circuit takes them in sequence as long as they are activated.

In the event that an alarm is restored, an added pulse is inserted on the end of the response signal to indicate this to the central station. This pulse is indicated as I in FIG. 2B. The restore condition is detected by space circuit 507, which indicates it to restore pulse generator circuit 508. The output of restore circuit 508 is sent to gate circuit 405 of FIG. 4 by applying it to another input of NAND gate 506.

The adapter is arranged so that alarm sensors A2 and A3 have priority on the transponder adapter. Therefore, if the counter is at any location and an A2 or A3 alarm is activated, the counter will automatically return to a position such that on the next interrogation of that address, A2 will be transponded, then A3, and then the other alarm sensors in sequence through A9.

While the invention has been particularly shown and described with reference to preferred embodiments thereof, it will be understood by those skilled in the art that various changes in form and details may be made therein without departing from the spirit and scope of the invention. In particular, the number of possible addresses for remote stations can be increased as can the number of transponders and their related response frequencies. Many of the limitations cited herein are a result of operational limitations imposed by NFPA 71 and UL 611.

We claim:

1. A signaling system comprising:

signal transmission means for transmitting state information;

central station means for generating and applying an interrogation signal to said signal transmission means, for detecting a response signal from said signal transmission means and for displaying the state information represented by the characteristics of the response signal; the interrogation signal having predetermined characteristics and comprising at least a first burst of a first frequency, a first blank space, a second burst of the first frequency, and a second blank space; and at least one remote station means, connected in parallel with said central station means through said signal transmission means, for detecting the interrogation signal from said signal transmission means and for generating and applying at least one component of the response signal to said signal transmission means, said remote station means comprising at least one sensor means for indicating the state of conditions at said remote station means and at least one transponding means connected to said signal transmission means for generating at least one component of the response signal when at least the first burst and first space of the interrogation signal have particular predetermined characteristics; the component of the response signal generated being a burst of a second frequency having a predetermined characteristic dependent on the indication from said monitoring means and being applied to said signal transmission means during the second blank space of the interrogation signal.

2. A signaling system as claimed in claim 1 wherein said signal transmission means is a telephone facility in which at least parts of the telephone facility are voice grade channel, and the first and second frequencies are different audio frequencies.

3. A signaling system as claimed in claim 1 wherein said interrogation signal and said response signal are comprised of a series of bursts separated by spaces.

4. A signaling system as claimed in claim 1 including a plurality of remote station means each connected in parallel with said central station means through said signal transmission mean, said central station means being adapted to generate an interrogation signal having a plurality of different combinations of first bursts and first spaces of various predetermined durations, each different combination being associated with a separate one of said remote station means, each of said remote station means being adapted to detect its associated combination and to transpond the state of its monitor upon such detection.

5. A signaling system as claimed in claim 4 including a group of remote station means responsive to the same combination of first burst and first duration, each transponding means at each remote station means of said group having a plurality of monitors associated with it and generating a component of the response signal with a frequency different from the frequencies of the other transponding means of said group of remote station means and different from the first frequency of the interrogation signal, the width of the component of the response signal depending on the indications from the monitors associated with the transponding means.

6. A signaling system as claimed in claim 5 wherein said central station means comprises:

decoding means for filtering the response signal to separate the components generated by each transponding means of said group of remote station means into frequency bursts of predetermined frequency, for comparing the durations of the frequency bursts with a reference, and for generating an alarm signal in response to the comparisons;

display means for displaying the state of the monitors of the remote station; and control means for automatically generating the interrogation signal in response to internal signals so that the combinations of first bursts and first spaces occur in a prescribed manner and for activating the display means in response to the internal signals and the alarm signals from said decoding means whenever a change in the state of a monitoring means is indicated by the alarm signal.

7. A signaling system as claimed in claim 6 wherein said decoder means includes means for detecting the absence of a response burst signal and for generating a missing pulse signal in response to the detection, the missing pulse signal being used by said control means to indicate the failure of a remote station.

8. A signaling system as claimed in claim 6 wherein said control means includes means for generating data and time information signals which are used by said control means to cause said display means to indicate the date and time of a change in the state of a monitoring means.

9. A signaling system as claimed in claim 1, including an alarm inspector module connected to the transponding means for injecting an inspector signal into the response signal which indicates that the remote station is being tested.

* * * * *